United States Patent [19]

Nakayama et al.

[11] Patent Number: 4,806,919
[45] Date of Patent: Feb. 21, 1989

[54] MULTI-WINDOW DISPLAY SYSTEM WITH MODIFICATION OR MANIPULATION CAPABILITY

[75] Inventors: Yoshiyuki Nakayama, Kawasaki; Kunihiro Yanagi, Sagamihara; Kenjiro Mori, Yokohama, all of Japan

[73] Assignee: Hitachi, Ltd., Tokyo, Japan

[21] Appl. No.: 729,753

[22] Filed: May 2, 1985

[30] Foreign Application Priority Data

May 2, 1984 [JP] Japan .................................. 59-87686

[51] Int. Cl.⁴ .............................................. G09G 1/00
[52] U.S. Cl. .................................... 340/721; 340/723; 340/734
[58] Field of Search ............... 340/721, 723, 724, 709, 340/734, 750

[56] References Cited

U.S. PATENT DOCUMENTS

| | | | |
|---|---|---|---|
| 4,484,302 | 11/1984 | Cason et al. | 340/721 X |
| 4,542,376 | 9/1985 | Bess et al. | 340/721 X |
| 4,555,775 | 11/1985 | Pike | 340/734 X |
| 4,559,533 | 12/1985 | Bess et al. | 340/721 X |
| 4,586,035 | 4/1986 | Baker et al. | 340/723 X |
| 4,642,790 | 2/1987 | Minshull et al. | 340/724 |
| 4,649,377 | 3/1987 | Urabe | 340/721 |

Primary Examiner—Gerald L. Brigance
Assistant Examiner—Jeffery A. Brier
Attorney, Agent, or Firm—Antonelli, Terry & Wands

[57] ABSTRACT

A multi-window display method and system for displaying a plurality of overlapping windows so that only portions of windows that are not covered by other windows are displayed. In displaying the first window and then the second window over the first window, the first partial area which belongs to the first window and is covered by the second window, and the second partial area which belongs to the first window but is not covered by the second window are detected; the first partial area is registered as a non-display area; the second partial area is registered as a display area; if reversal of the positional relationship between the first and second windows is instructed, the first partial area, which has been registered as a non-display area, is registered as a display area; and the newly registered display area is displayed on the display unit. The method and system enable speed-up of displaying overlapping windows.

6 Claims, 19 Drawing Sheets

STACK 808

STACK 808

STACK 808

STACK 808

(1610)    | 1610 | x11 | y11 | a11 | b11 | (1611) | nil | nil |
(1611)    | x11 | y11 | a11 | b11 | NOTHING |
(1620)    | 1620 | x21 | y21 | a21 | b21 | (1621) | | nil |
(162001)  | 1610 | (1622) | nil |                                    (162001)
(1621)    | x21 | y21 | a22 | b22 | (1623) |
(1622)    | x22 | y21 | a21-a22 | b22 | nil |
(1623)    | x21 | y22 | a21 | b21-b22 | nil |
(1630)    | 1630 | x31 | y31 | a31 | b31 | (1631) | | nil |
(163001)  | 1620 | (1632) | nil |                                    (163001)
(1631)    | x31 | y31 | a32 | b32 | (1633) |
(1632)    | x32 | y31 | a31-a32 | b32 | nil |
(1633)    | x31 | y32 | a31 | b31-b32 | nil |

| (1610) | 1610 | x11 | y11 | 911 | b11 | (1611) | nil |
| (1611) | x11 | y11 | a11 | b11 | nil |
| (1630) | 1630 | x31 | y31 | a31 | b31 | (1634) | nil |
| (163001) | 1610 | (16322) | nil |
| (1634) | x31 | y31 | a32+a33 / b33 | (1635) |
| (16322) | x31 | y32 | a31-a32-a33 / b33 | nil |
| (1635) | x33 | y31 | a31 | b31-b33 | nil |

MULTI-WINDOW DISPLAY SYSTEM WITH MODIFICATION OR MANIPULATION CAPABILITY

BACKGROUND OF THE INVENTION

The present invention relates to a multi-window display system and a method of displaying information in the form of separate or overlapping windows on a display screen, wherein each information window can be made, deleted or moved conveniently on the screen.

The conventional method of erasing or replacing some of overlapping information windows on a display screen is to delete all information windows and then put back the information windows after modification has been made. This method, however, takes too long a time for displaying information windows. Such a method is described, for example, in "BRUWIN: An adaptable design strategy for window manager/virtual terminal systems" by N. Meyrowitz et al., Proc. 8th Symp. Operating Systems Principles ACM. N.Y. 1981.

SUMMARY OF THE INVENTION

An object of this invention is to provide a multi-window display system capable of modifying part of overlapping information windows, thereby allowing quick and natural display modification.

In order to achieve the above objective of this invention, each window is subdivided into rectangles called "internal areas". For example, as shown in FIG. 1, when a window 110 is partly covered by another window 120, that portion of the window 110 which is not covered by the window 120 is divided into internal areas called "display internal areas" and the other portion of the window 110 that is covered by th window 120 is called a "non-display internal area".

If the window 110 is replaced by another window not shown in the figure, it is again divided into internal areas. A non-display internal area is not further divided unless the window which directly covers the internal area is removed.

Division of a window may be made in such a way that the horizontal and/or vertical sides of the superimposed window or of the internal areas as shown in FIG. 1 are extended. Information in internal areas are memorized as a set of tables, and when the positional relation between overlapping windows changes, the tables are modified so that display of only modified internal areas is varied.

BRIEF DESCRIPTION OF THE DRAWINGS

Briefly, FIG. 4 illustrates three overlapping windows for explaining the invention.

FIG. 5 shows three overlapping windows corresponding to a rearranging of windows illustrated in FIG. 4.

FIG. 6 illustrates the remaining and rearranged overlapping windows subsequent to a deletion of window 420 of FIG. 4.

FIG. 7 shows three overlapping windows subsequent to a different rearrangement of the windows illustrated in FIG. 4.

FIGS. 11(a–d) illustrate the process of windowing by developing window management records including non-display internal management records for overlapping windows in accordance with the present invention.

FIGS. 12(a–d) through 15 illustrate exemplarily diagrams showing the process of making a new window, deleting a window or changing relative window positions by accordingly making, selecting and re-composing internal areas of windows in accordance with the present invention.

FIG. 11b shows the window management record related to the window W1 in FIG. 11a.

FIG. 11d shows the internal area record for the non-display internal area IA3 in FIG. 11a.

FIG. 12b illustrates a flow chart for creating a new window corresponding to step 1210 in FIG. 12a.

Briefly, FIG. 16a shows overlapping or superimposed windows displayed on a CRT screen and as it relates to the internal area table.

FIG. 16b shows a display of superimposed windows and the respective internal area table after window 1620 has been removed from the display of FIG. 16a.

FIG. 16c shows a display after the internal area 1630 has been rearranged in the display of FIG. 16b.

DESCRIPTION OF THE PREFERRED EMBODIMENT

Figure 1:
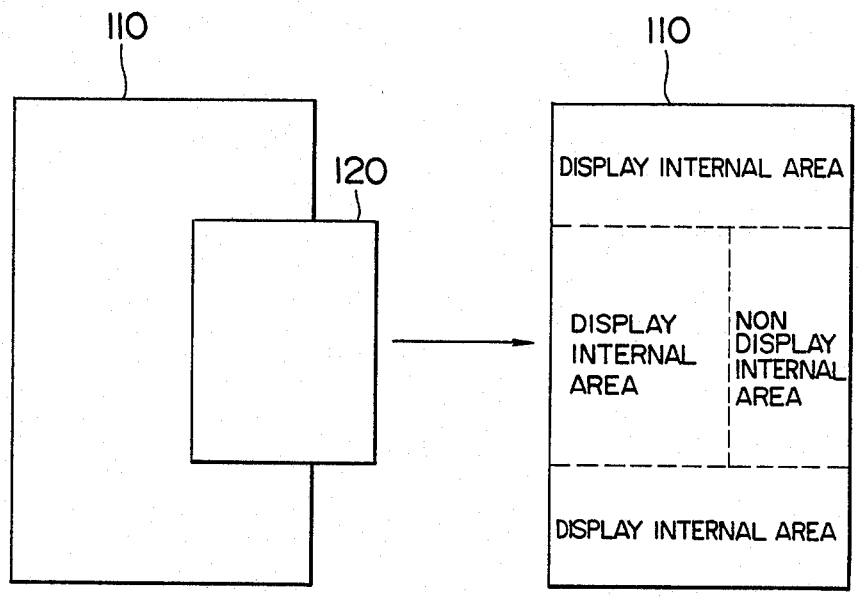
FIG. 1 is an illustration used to explain division of a window into internal areas.
Figure 2:
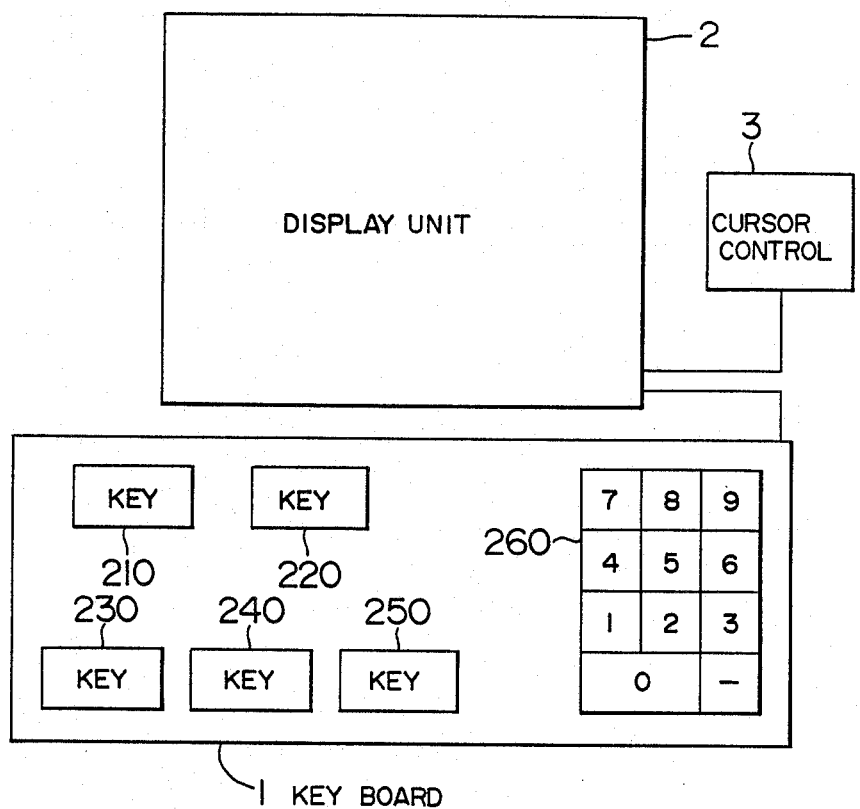
FIG. 2 is a general diagram of a display system to which the present invention is applied.

An embodiment of the present invention will now be described in detail with reference to the drawings. In FIG. 2, the inventive display system consists of a keyboard 1, a CRT display unit 2 and a cursor control unit 3 which moves the cursor on the screen of the display unit 2. The keyboard 1 includes a window upper-left position setting key 210, a window lower-right position setting key 220, a window selection key 230, a window deletion key 240, a window superimposition modification key 250, and a ten-key unit 260 including 10 numeric keys and a negative-sign key.

Figure 3:
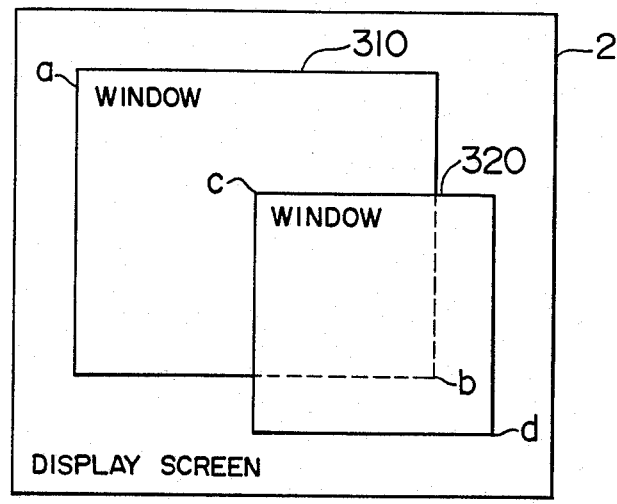
FIG. 3 is an illustration of two overlapping windows on a displaced screen processed according to the present invention.

The following describes the procedure of displaying overlapping windows as shown in FIG. 3 on the blank screen of the CRT display unit 2. First, the operator operates the cursor control unit 3 to bring the cursor to the upper left corner a of a window 310 to be created, and then presses the window upper-left position setting key 210. Subsequently, the operator moves the cursor to the lower right corner b of the window, and presses the window lower-right position setting key 220. The system responds to these operations, and the window 310 is displayed. Similarly, another window 320 is displayed by positioning the cursor to the upper left corner c and to the lower right corner d of the window, and pressing the window upper-left position setting key 210 and window lower-right position setting key 220, sequentially. Then, the window 320 is displayed over the window 310.

Figure 4:
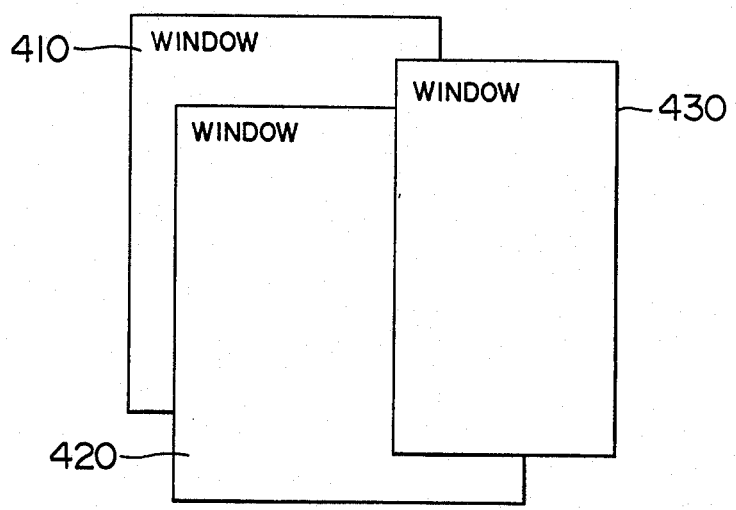
FIGS. 4–7 are illustrations of a plurality of overlapping windows used for explaining the processing technique or method of windowing in accordance with the present invention in conjunction with using the cursor control and keyboard, including selecting, changing the relative positioning of the respective overlapping windows, as well as deleting a window.
Figure 5:
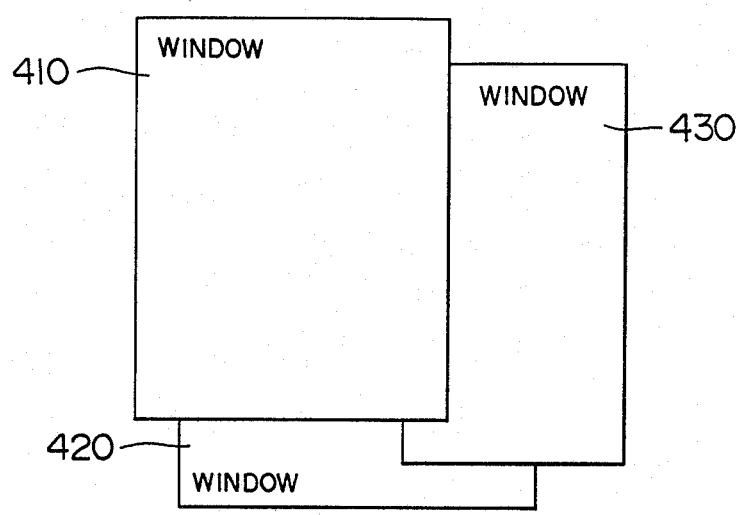
Figure 6:
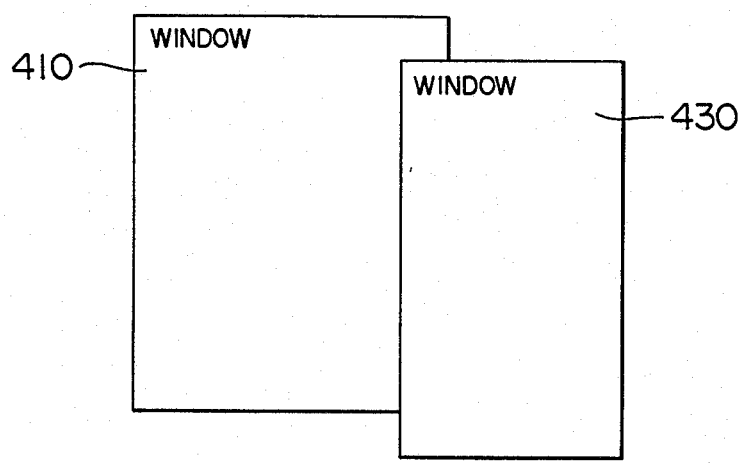
Figure 7:
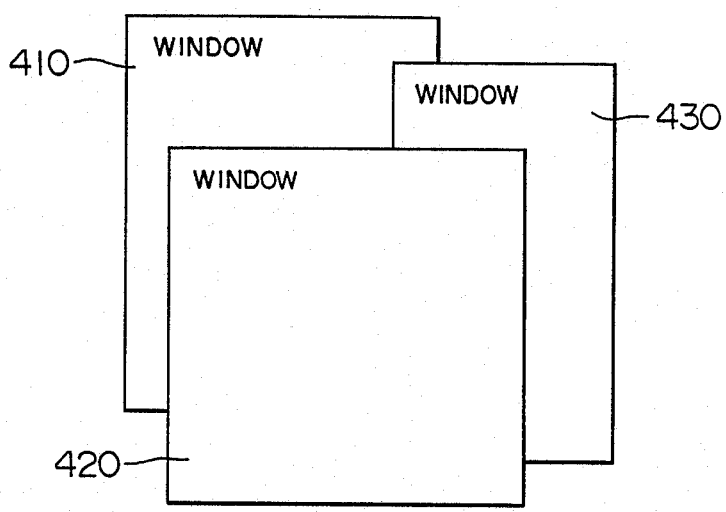

Assuming the initial three window position shown in FIG. 4, if it is now intended to rearrange the windows to display a window 410 that is superimposed over the remaining two windows, the operator brings the cursor to the displayed portion of the window 410 and presses the window selection key 230. Then, display is modified as shown in FIG. 5. The same result is reached by pressing the window superimposition modification key 250, the negative sign key and the numeric "3" key (since the window 410 is the third window counted from the top window) sequentially in this order. If it is intended in FIG. 4 to delete the window 420, the operator brings the cursor to the displayed portion of the window 420, and presses the window deletion key 240. Then, display is modified as shown in FIG. 6. If it is intended in FIG. 4 to move the window 430 to the position between the windows 410 and 420, the operator presses the window superimposition modification key 250 and the numeric "2" key (since the window 430 is intended to be moved to the second position counted from the top window in th current arrangement) sequentially in this order. Then, display is modified as shown in FIG. 7.

Figure 8:
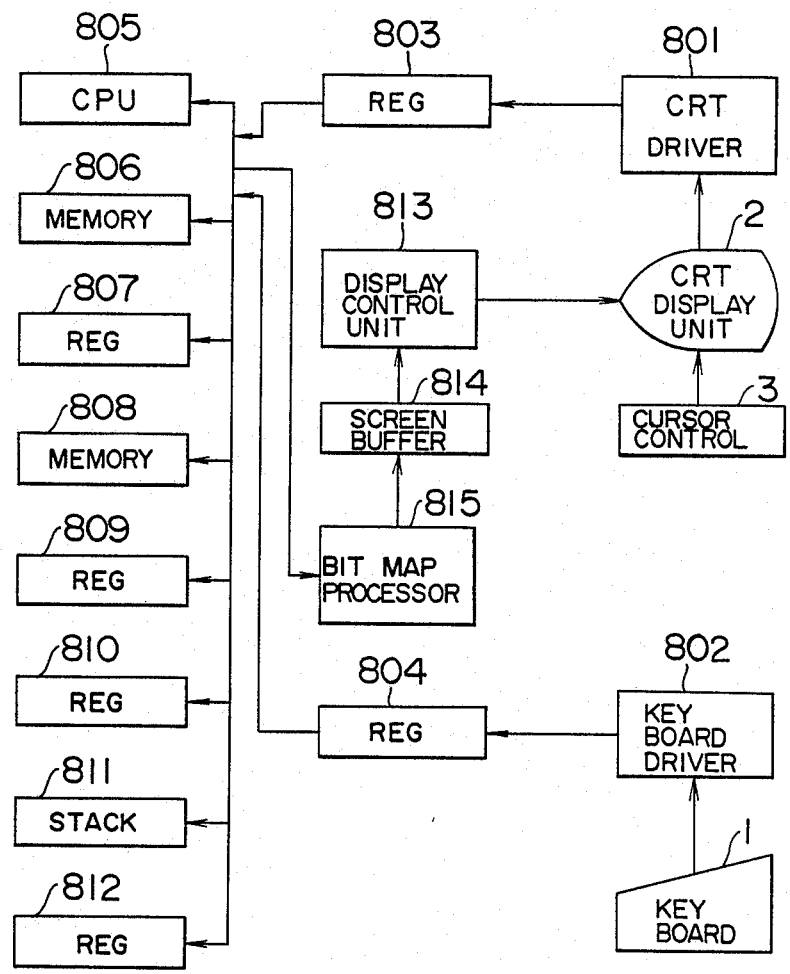
FIG. 8 is a block diagram of a display system according to an embodiment of the present invention.
Figure 9:
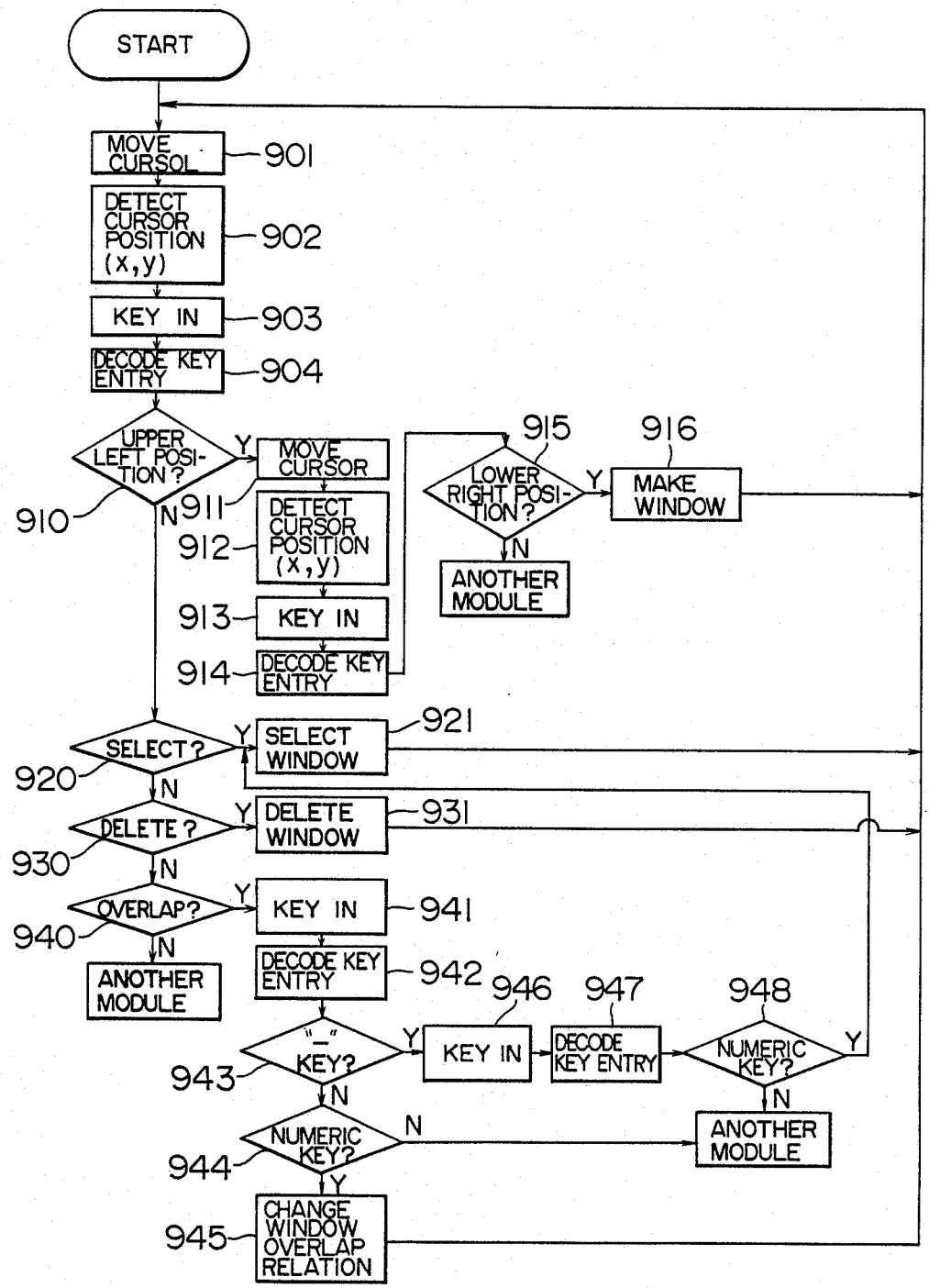
FIG. 9 is a flowchart used to explain the operation according to an embodiment of the present invention.

FIG. 8 shows in block diagram an example of the inventive multi-window display system. The processing of the system for modifying window display will be described in detail with reference to FIG. 9.

The cursor is moved to the desired position through the operation of the cursor control unit 3 (step 901). Cursor positional information is stored in register 803 by CRT driver 801 (step 902). In response to operator's action on one of the window upper-left position setting key 210, window lower-right position setting key 220, window selection key 230, window deletion key 240 and window superimposition modification key 250 (step 903), keyboard driver 802 generates a code (step 904) and it is stored in register 804. CPU 805 which may be, for example, a 16 bit microcomputer "68000" manufactured by Hitachi, commences a program in memory 806 depending on the code stored in the register 804 (steps 910, 920, 930, 940). The program first translates the cursor position on the CRT display unit 2 as stored in the register 803 into a location in screen buffer 814 which contains display information as dot-matrix data, and stores the converted window position in register 807.

Figure 10A:
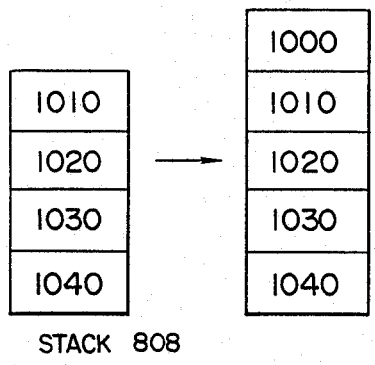
FIGS. 10a to 10d are a set of diagrams used to explain the arrangement of the internal area tables.

In case the window upper-left position setting key 210 or the window lower-right position setting key 220 has been pressed (steps 910, 915), the content of the register 807 is transferred to register 809 or 810, respectively. Stack 811 is provided to store window identifiers 1010–1040 as shown on the left-hand side of FIG. 10a on a first-in-last-out basis. FIG. 10a shows on its right-hand side the content of the stack 811 which is further added by a window identifier 1000.

Bit map processor 815 which moves, transfers or displays dot-matrix data in the screen buffer 814 makes reference to cursor positional data stored in the registers 809 and 810 to write a new window in the screen buffer 814. Display controller 813 operates to display the new window on the CRT display unit 2. The program updates the internal area table for controlling internal areas of each window within the memory 808 by adding window positional data stored in the registers 809 and 810 to the internal area table (step 916).

Figure 10B:
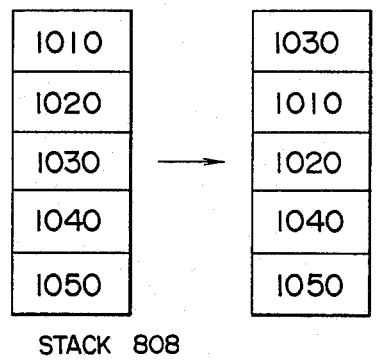

In case the window selection key 230 has been pressed (step 920), test is made to determine as to which window identifier in the stack 811 the content of the register 803 corresponds to, and the address of the relevant window identifier is stored in register 812. The bit map processor 815 writes the content of the non-display internal area addressed by the register 812 into the screen buffer 814. The program makes reference to the register 812 and places the window identifier 1030 at the top of the stack 811. As shown in FIG. 10b, the identifier of the window is stored at the top of the stack 811, and the internal area table within the memory 808 is updated (step 921).

Figure 10C:
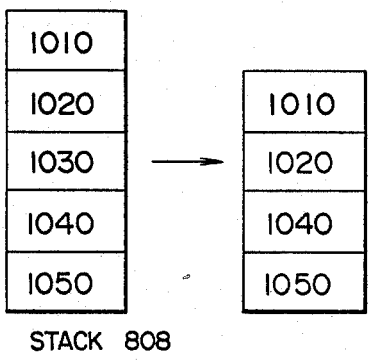

In case the window deletion key 240 has been pressed (step 930), test is made to determine as to which window identifier in the stack 811 the content of register 803 is consistent with, and the address of the relevant window identifier is stored in the register 812. The bit map processor 815 writes part of the non-display internal area of a window covered by the display internal area of the window indicated by the content of register 812 into the screen buffer 814. The program eliminates the window identifier 1030 in the stack 811. As shown in FIG. 10c, the stack 811 is modified, and the internal area table within the memory 808 is updated (step 931).

Figure 10D:
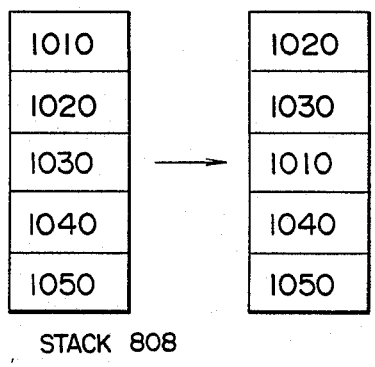

In case the window superimposition modification key 250 has been pressed (step 940), the program waits for the subsequent key entry (steps 941, 942). If entry of the negative sign key follows (step 943), the processing of step 921 for a window specified by the subsequent numeric key entry is carried out (steps 946, 947, 948, 921). If a numeric key has been pressed without being preceded by the negative sign key (step 944), the bit map processor 815 writes the content of internal area that is included in a window located above the keyed-in number N and covered directly by the current top window into the screen buffer 814. The program moves the identifier 1010 which is currently located at the top to the third place. As shown in FIG. 10d, the window identifier 1010 is placed at the third position from the top in the stack 811, and the internal area table within the memory 808 is updated (step 945).

Next, the program implementation for updating the stack 811 and internal area table will be described in detail with reference to the drawings. The internal area table is an assembly of a window management table, a non-display internal area management table and a data table. The window management table contains window management records, the non-display internal area management table contains non-display internal area management records, and the data table contains internal area records.

Figure 11A:
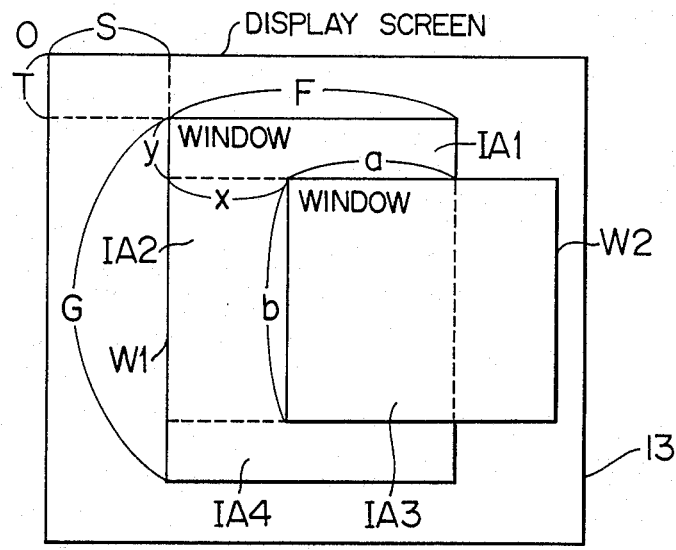
FIG. 11a shows overlapping windows displayed on a CRT display unit in conjunction with a coordinate system.
Figure 11B:
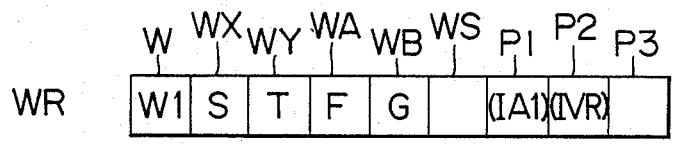
Figure 11C:
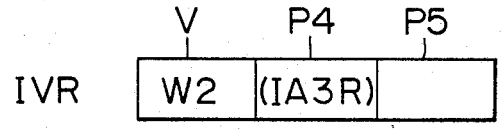
FIG. 11c shows the non-display internal area management record of the window management record in FIG. 11b.

The window management record WR shown in FIG. 11b is made up of window identifier W, upper left position data WX and WY of the window in the screen buffer 814, lateral length WA and longitudinal length WB of the window, address WS of the segment buffer for storing the contents of the window, starting address P1 of the internal area record related to the display internal area included in the window W, starting address P2 of the non-display internal area management record for controlling the non-display internal area included in the window W, and address P3 of the next window management record. The non-display internal area management record IVR shown in FIG. 11c provides the starting address of the internal area record related to the non-display internal area which is covered directly by another window V, and it includes the starting address P4 of the internal area record for the non-display internal area and the address P5 of the next non-display internal area management record. The internal area record IAR shown in FIG. 11d is made up of top left position data X and Y of the internal area in the screen buffer 13, lateral length A and longitudinal length B of the internal area, and address P6 of the next internal area record.

FIG. 11a shows overlapping windows displayed on the CRT display unit. The CRT screen has a coordinate system extending from the origin 0 at the upper left corner to the right and to the bottom. The display shows that a window W2 is placed over a window W1. The super-imposition of the windows W1 and W2 causes the W1 to be divided into four internal areas IA1, IA2, IA3 and IA4. The IA3 is a non-display internal area covered by W2, and the remainder are display internal areas. Symbols S, T, F, G, x, y, a, and b represent lengths as shown.

The WR shown in FIG. 11b is the window management record related to the window W1, with P1 indicating the address of the internal area record for the IA1, P2 indicating the address of the non-display internal area management record caused by the W2. Entry for the WS and P3 are not filled in the figure. The IVR stores W2 in V, indicating that the record is the management information for the non-display internal area covered by the window W2. The value of P4 represents the address of the non-display internal area record IA3 covered actually by the window W2. Since the state of FIG. 11a includes only one non-display internal area, the entry of P5 in FIG. 11c is not filled.

Figure 11D:
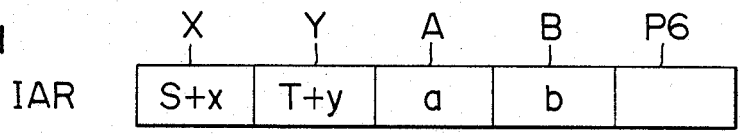

FIG. 11d shows, as an example of the internal area record, the internal area record for the non-display internal area IA3. In this case, the coordinates of the upper left position are determined for W1. Although the entry of P6 is not filled in FIG. 11d, if the internal area is located at the end of the display or non-display internal area record, the address of the window management record for the window which belongs to that internal area, i.e., the address of WR, is stored in P6.

Figure 12A:
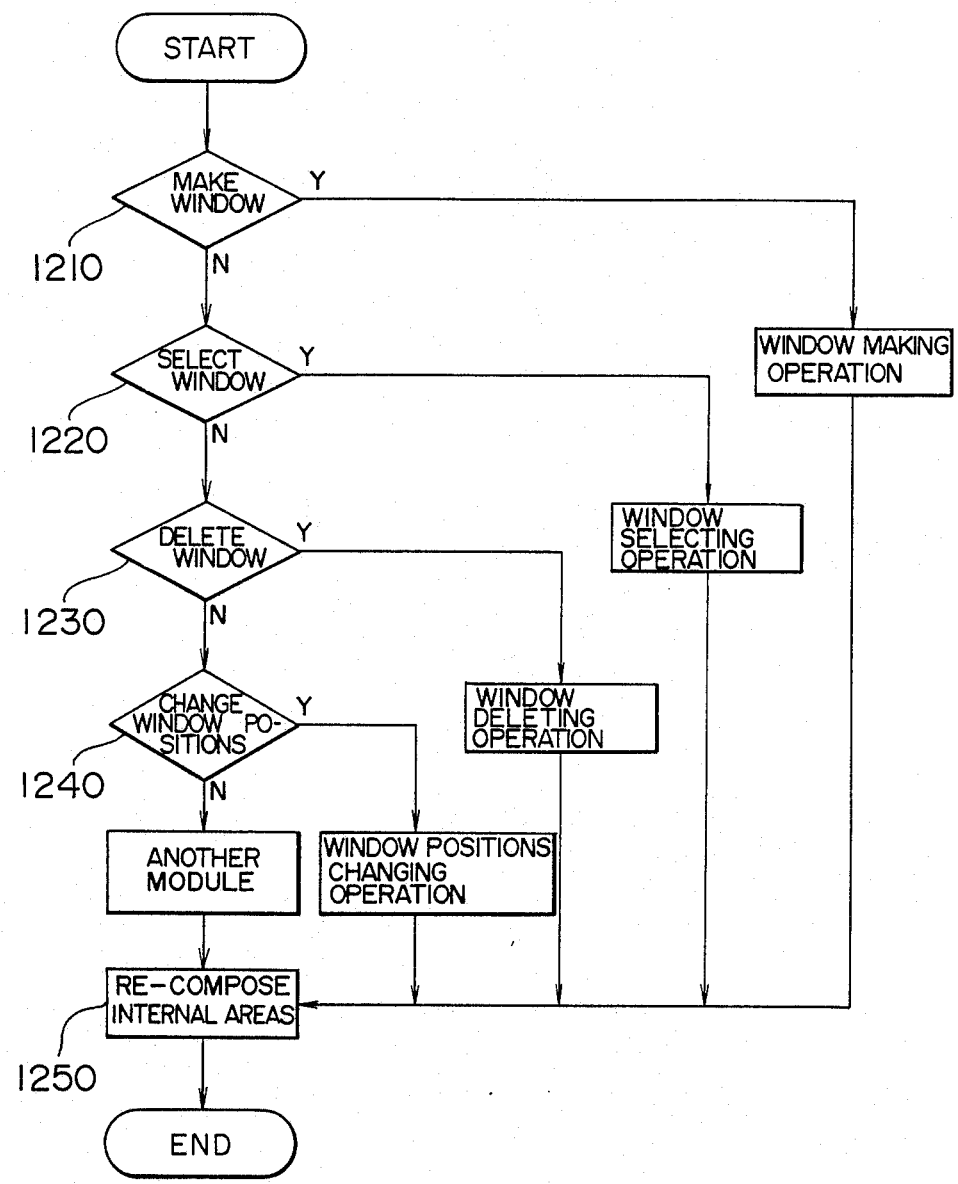
FIG. 12a shows a flowchart for describing the process of updating the internal area table.

The following describes the method of updating the internal area table in each case separately with reference to FIG. 12a.

Figure 12B:
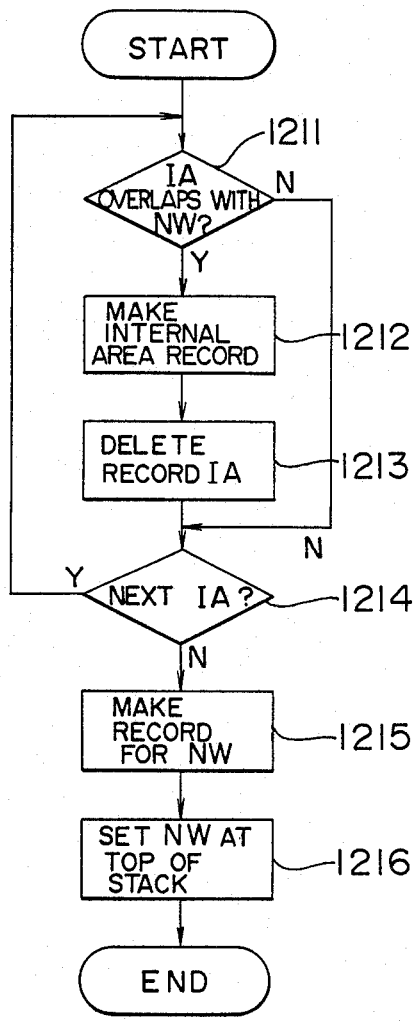
Figure 13:
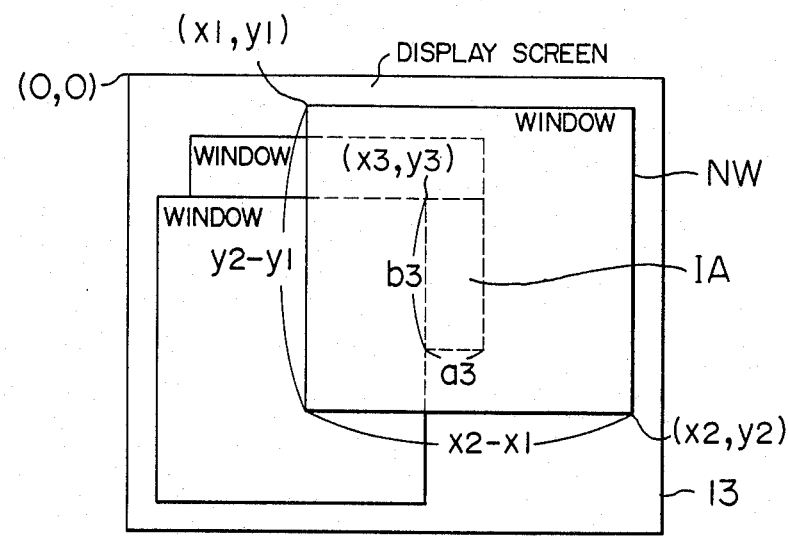
FIG. 13 illustrates the effect of creating a new window over an existing display internal area on a display screen and as it relates to the window making program shown in FIG. 12b.
Figure 14:
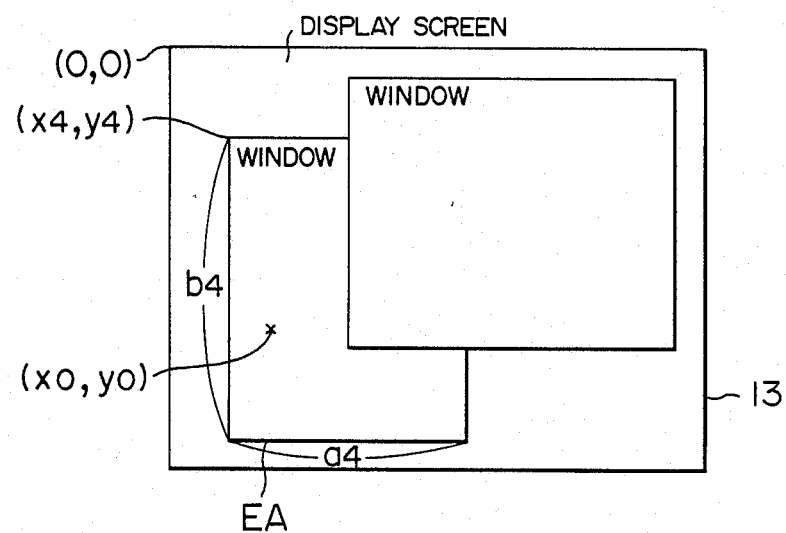
FIG. 14 illustrates superimposed windows on a display screen in conjunction with explaining the window selection process.

When a new window NW is created, the window making program shown in FIG. 12b is started. In FIG. 13, common portions in the existing display internal area IA and the new window NW is examined (step 1211). The bit map processor 815 (FIG. 8) extracts the content of the display internal area IA from the segment buffer indicated by WS of the corresponding window management record and loads it into the screen buffer 814.

The existence of common portions for the two areas is determined by the following set of conditional expressions.

$$x1 < x3 + a3$$

$$x3 < x2$$

$$y1 < y3 + b3$$

$$y3 < y2$$

where (x1, y1) represent the coordinates of the upper left corner of the window NW, (x2, y2) represent the coordinates of the lower right corner of the window NW, and (x3, y3) represent the coordinates of the upper left corner of the display internal area IA.

If a common portion is found, the existing display internal area IA is divided, and a new display internal area record and a non-display internal area record to be covered by the window NW are added (step 1212). Division of an area is carried out as follows. Suppose two rectangles A and B exist. When the rectangle A (x coordinate of left side=Aleft; y coordinate of upper side=Atop; x coordinate of right side=Aright; and y coordinate of lower side=Abottom) is overlaid by the rectangle B (x coordinate of left side=Bleft; y coordinate of upper side=Btop; x coordinate of right side=Bright; and y coordinate of lower side=Bbottom), the rectangle A is divided as follows.

(i) For Aleft>Bright, or Atop>Bbottom, or Aright<Bleft, or Abottom<Btop:
There is no common portion for A and B.

The following is the processing for the case where A and B have a common portion.

First, a common portion of A and B, i.e., a portion of A covered by B, is obtained.

(ii) A rectangle shared by A and B is obtained as the x coordinate of the left side being max(Aleft, Bleft), i.e., the larger of Aleft and Bleft when they are not the same, y coordinate of upper side being max(Atop, Btop), x coordinate of right side being min(Aright, Bright), i.e., the smaller of Aright and Bright when they are not the same, and y coordinate of lower side being min(Abottom, Bbottom).

Finally, it will be possible that A is not covered at all by B even though A is overlaid by B, and such a portion is obtained as follows.

(iii) For Aleft Bleft: The following rectangles are not covered by B.
x coordinate of left side equals Aleft y coordinate of upper side equals max(Atop, Btop)
x coordinate of right side equals Bleft−1
y coordinate of lower side equal min(Abottom, Bbottom)

(iv) For Atop≦Btop: The following rectangles are not covered by B.
x coordinate of left side equals Aleft
y coordinate of upper side equals Atop
x coordinate of right side equals Aright
y coordinate of lower side equals Btop−1

(v) For Aright≧Bright: The following rectangles are not covered by B.
x coordinate of left side equals Bright+1
y coordinate of upper side equals max(Atop, Btop)
x coordinate of right side equals Aright
y coordinate of lower side equals min(Abottom, Bbottom)

(vi) For Abottom≧Bbottom: The following rectangles are not covered by B.
x coordinate of left side equals Aleft
y coordinate of upper side equals Bbottom+1
x coordinate of right side equals Aright
y coordinate of lower side equals Abottom Accordingly, portions of A that are not covered by B are obtained as an assembly of four rectangles (iii), (iv), (v) and (vi) at maximum.

The internal area record related to the display internal area IA is deleted (step 1213). Subsequently, the window management record for the window NW is added to the current window management table (step 1215). Assuming the contents of registers 809 and 810 to be (x1, y1) and (x2, y2) as shown in FIG. 13, the contents of the window management record WR (FIG. 11b) will be WX=x1, WY=y1, WA=x2−x1, and WB=y2−y1. The segment buffer indicated by WS contains the initial state of the window. P2 is blank. P3 indicates the address of the top window management record in the internal area table, and the internal area record pointed by P1 indicates the window NW itself. The contents of the internal area record IAR (FIG. 11d) will be X=WX, Y=WY, A=WA, B=WB, and P6=blank. In addition, the identifier of the window NW is placed at the top of the stack 811 (step 1216).

The bit map processor 815 extracts the content of the newly added window NW from the segment buffer pointed by WS of the corresponding window management record, and stores it in the screen buffer. At this time, the contents of common portion for the NW and IA are replaced with the content of NW that has newly been stored.

Upon completion of updating, a plurality of windows are displayed on the display unit, and after the record for the display and non-display areas have been added to the window management record, the subsequent selecting process is carried out.

Figure 12C:
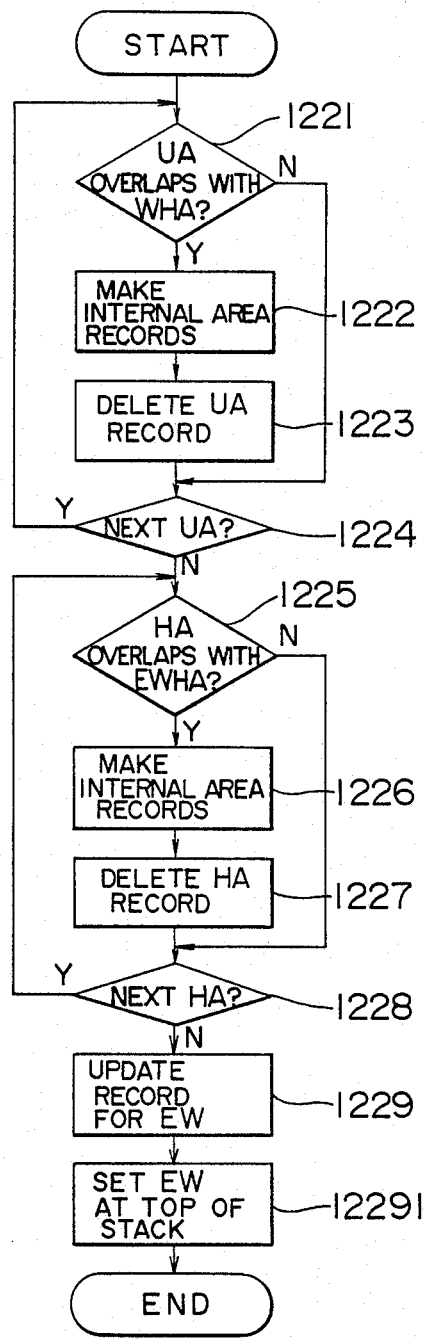
FIG. 12c illustrates a flowchart corresponding to the window selection processing program effected by depressing the window selection key 230 or the window superimposition modification key 250 of the keyboard in FIG. 2.

The window selection key 230 or window superimposition modification key 250 is used to start the window selection processing program shown in FIG. 12c when the existing window EW has been selected (step 1220). Selection of the window EW means that for the cursor position of (x0, y0) with the window management record for the window NW being WX=x4, WY=y4, WA=a4 and WB=b4, both of x4<x0<x4+a4, y4<y0<y4+b4 are met, and there is no window above the window EW that satisfies both of the above inequalities. At this time, the stack 811 is checked for the common portion of each display internal area VA of the window above the window EW which has already been registered and each non-display internal area EWHA of the window EW which has already been registered (step 1221), and if a common portion is found, the window located above the window EW is divided into a certain number of display internal areas an non-display internal areas. These areas are added to the display internal area record and non-display internal area record covered by the window EW (step 1222).

The bit map processor 815 (FIG. 8) extracts only the content of the newly added display area from the segment buffer, and stores it in the screen buffer 814. The old content of the screen buffer 814 is replaced with the newly stored content.

The internal area record related to the window above the window EW is deleted (step 1223). Subsequently, the stack 811 is checked for a common portion for each non-display internal area HA of the window below the window EW covered directly by the window EW and each non-display internal area EWHA of the window EW (step 1225). If a common portion exists, the area HA is divided into a non-display internal area covered by a window which directly covers the area EWHA and a non-display internal area which will be covered directly again by the window EW after modification. The divided areas are added to the non-display internal area record covered by the window which directly covers the area EWHA and the non-display internal area record covered directly by the window EW (step 1226), and then the old internal area record related to HA is deleted (step 1227).

The non-display internal area management record for the window EW and internal area record are all deleted, and an internal area record including the window EW itself as an internal area is created (step 1229), and the stack 22 is modified so that the identifier for the window EW is moved from the current position to the top (step 12291).

Figure 12D:
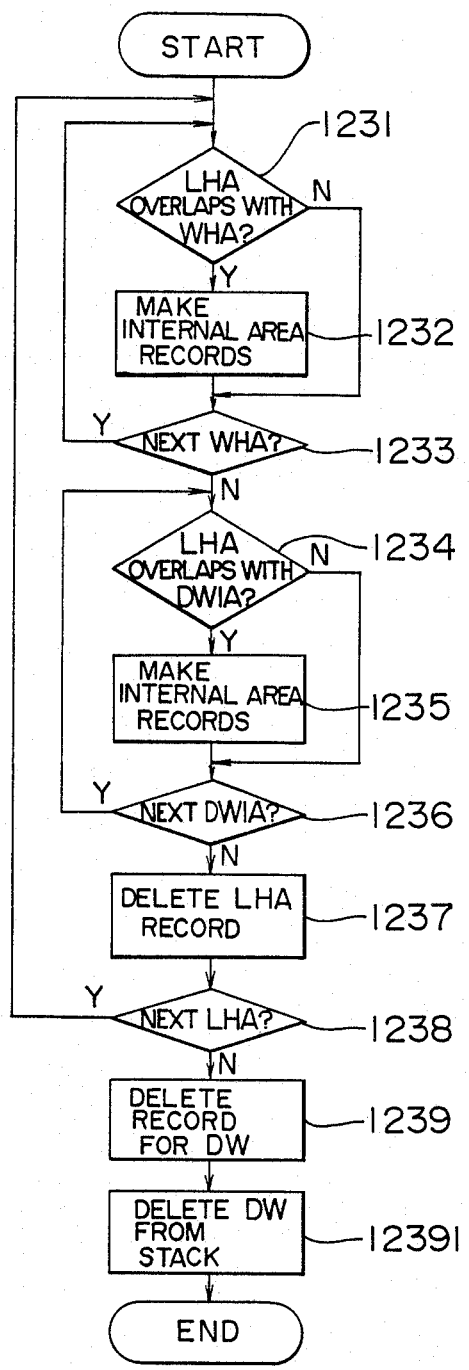
FIG. 12d illustrates a flowchart corresponding to the process of deleting a window after depressing the window deletion key 240 in the keyboard shown in FIG. 2.

When the window deletion key 240 is used to delete the existing window DW, the window deletion program shown in FIG. 12d is started (step 1230). First, the stack 811 is checked for a common portion for each non-display internal area LHA which belongs to a window below the window DW and covered directly by the window DW and each non-display internal area DWHA and each display internal area DWIA of the window DW (steps 1231, 1234). If a common portion exists, a rectangle which is not displayed because of being covered directly by a window which directly covers the area DWHA and a rectangle which becomes displayed by deletion of the window DW, both within the area LHA, are made to be new internal areas. The areas are added to the non-display internal area record covered by a window which directly covers the area DWHA and the display internal area record (steps 1232, 1235). The bit map processor 815 extracts only the content of the newly added display area from the segment buffer, and stores it in the screen buffer 814. The internal area record related to the LHA is deleted (step 1237). The record related to the window DW is deleted (step 1239), and the identifier for the window DW is deleted from the stack 811 (step 12391).

Figure 12E:
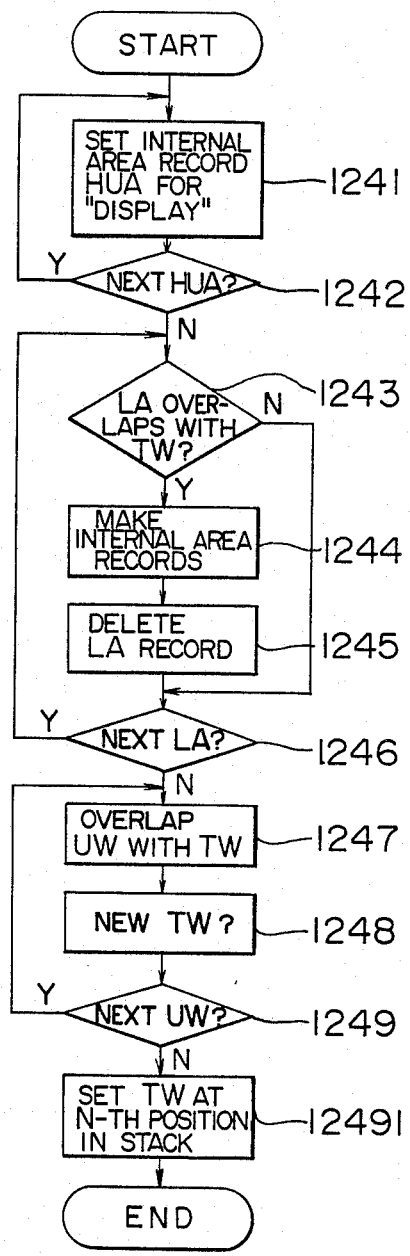
FIG. 12e illustrates a flow chart for the rearranging of the windows in a plurality of superimposing or overlapping windows by depressing the window superimposition modification key 250 in the keyboard shown in FIG. 2.

When the window superimposition modification key 250 is used to move the window TW located at the top of the stck 811 to the position specified by number N of numeric key entry, the superimposition modification processing program shown in FIG. 12e is started (step 1240). The internal area record for the non-display internal area HUA included in a window located at Nth place or above and covered directly by the window TW is changed to the display internal area (step 1241). Checking is made for a common portion for the window TW and the internal area LA included in a window located at the Nth place or below and covered directly by a window located above the Nth position excluding the window TW (step 1243). If a common portion exists, the area HA is divided into a rectangle which is not displayed because of being covered directly by the window TW and a rectangle which is not displayed because of being covered again by the window which covers the area HA from the beginning. These rectangles are added to the non-display internal area record covered directly by the window TW and the non-display internal area record covered by a window which covers the area HA from the beginning (step 1244), and the internal area record related to the area LA is deleted (step 1245). Subsequently, the window TW is divided into areas which are left displayed and areas which become undisplayed because of being covered that would occur when the window TW is covered sequentially with the (N−1)th through the second windows (step 1247). The result is used to create the non-display internal area management table and internal area record for the window TW (step 1248). The stack 811 is modified so that the identifier located currently at the top, i.e., the identifier for the window TW, is inserted between the (N−1)th and Nth positions of the stack 811 (step 12491).

In modifying the table, internal areas are recomposed when necessary so that the rectangle is as large as possible in the longitudinal or lateral direction, and the number of internal areas is as small as possible (step 1250).

When a set of internal areas, S=Ri i=1, 2, ..., n; where Ri is an internal area, is given, these areas are composed as follows.

(i) Ri is removed from S one at a time, and it is checked whether the resultant S can be composed with remaining Rj (j=1, ..., i−1, i+1, ..., n) in each case.

(ii) If all of Ri (i=1, ..., n) cannot be composed with any of Rj (j=1, ..., i−1, i+1, ..., n), the set S is already composed.

(iii) If composition is made between Ri and Rj, a resultant set of internal areas is defined as T=R1', ..., Rm'. Substituting $S^U T - Ri, Rj$ to a set S of internal areas, the above procedure beginning with (i) is iterated.

Figure 15:
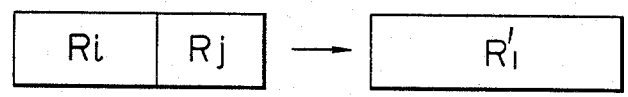
FIG. 15 illustrates the internal area relationships as they relate to the development of the internal area table.
Figure 15:
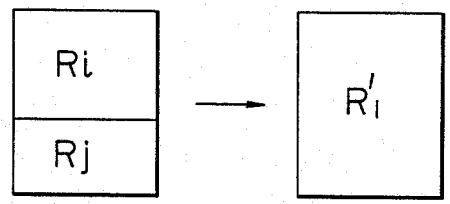
Figure 15:
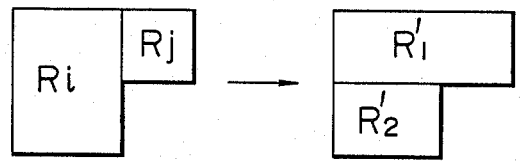
Figure 15:
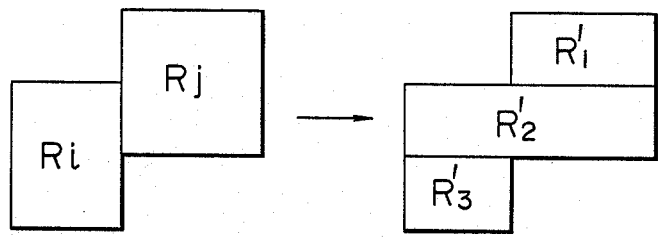
Figure 15:
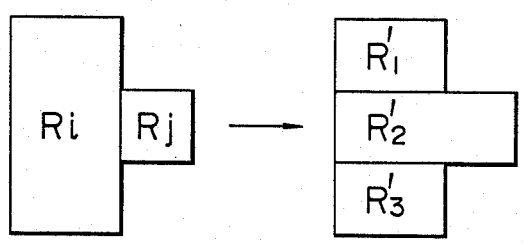

The composition described above occurs when Ri and Rj have a positional relationship as shown on the left-hand side of FIG. 15 (here, a composition technique is employed, in which priority is given to the lateral direction). Ri and Rj may be exchanged. The result of composition is shown on the right-hand side in FIG. 15.

Figure 16A:
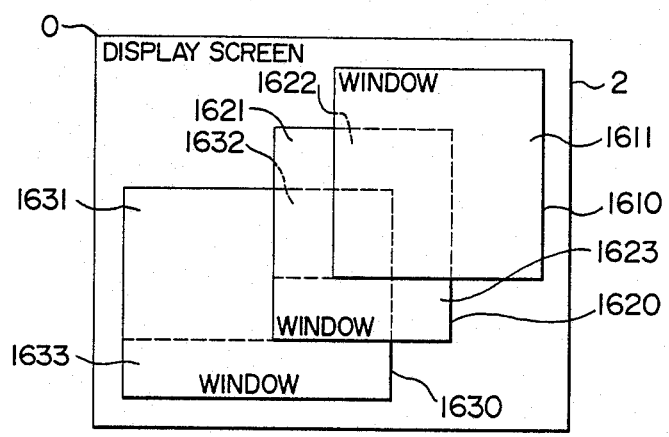
FIGS. 16a to 16c are a set of diagrams showing update of the internal area tables.

Finally, the method of updating the internal area table will be described with reference to FIGS. 16a to 16c. FIG. 16a shows windows 1610, 1620 and 1630 displayed on the CRT screen 2. The window 1610 has only display internal area 1611 which is the window 1610 by itself. The window 1620 has display internal areas 1621 and 1623 and a non-display internal area 1622 covered by 1610. The window 1630 has display internal areas 1631 and 1633 and a non-display internal area 1632 covered by 1620. The CRT display screen 2 has the origin 0. Forms (1610), (1620) and (1630) are the window management records of the corresponding windows shown in FIG. 16a (entry of WS is not filled). Forms (162001) and (163001) are non-display internal area management records, and forms (1611), (1621), (1622), (1623), (1631), (1632) and (1633) are internal area records of the corresponding internal areas.

Parameters x11, y11, a11 and b11 are for the window indicated by window identifier 1610.
x11: x coordinate of upper left corner (i.e., x coordinate of left side)
y11: y coordinate of upper left corner (i.e., y coordinate of upper side
a11: With (i.e., x coordinate of right side subtracted by x coordinate of left side, plus 1)
b11: Height (i.e., y coordinate of lower side subtracted by y coordinate of upper side, plus 1)
Parameters x21, y21, a21 and b21 are for window 1620.
x21: x coordinate of upper left corner
y21: y coordinate of upper left corner
a21: Width
b21: Height
Parameters a22 and b22 are for a display internal area (1621) of window 1620.
a22: Width
b22: Height
Parameter x22 is the x coordinate of the upper left corner of the non-display internal area (1622) in window 1620 covered by 1610.
Parameter y22 is the y coordinate of the upper left corner of the display internal area (1623) in window 1620.
x31, y31, a31 and b31 are for window 1630.
x31: x coordinate of upper left corner
y31: y coordinate of upper left corner
a31: Width
b31: Height
a32 and b32 are for a display internal area (1631) in window 1630.
a32: Width
b32: Height
Parameter x32 is the x coordinate of the upper left corner of the non-display internal area (1632) in window 1630 covered by 1620.
Parameter y32 is the y coordinate of the upper left corner of the display internal area (1633) in window 1630.
Parameters a33 and b33 are for the internal area (16321) in window 1630 which has become displayed.
a33: Width
b33: Height
Parameter x33 is the x coordinate of the upper left corner of the internal area (16322) in window 1630 which has become covered by 1610.
Parameter y33 is the y coordinate of the upper left corner of the internal area (16323) in window 1630 which has become displayed.

Figure 16B:
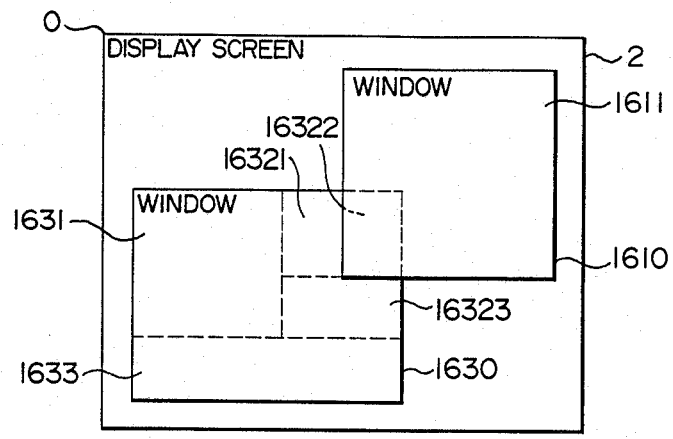

FIG. 16b shows a display after the window 1620 has been removed from the display of FIG. 16a. The internal area 1632 which has been covered by 1620 before its removal is newly covered partly by 1610 which covers 1622 after removal of 1620, resulting in the creation of display internal areas 16321 and 16323 and non-display internal area 16322 covered by 1610, and the internal area record related to the internal area 1632 is deleted. Forms (16321), (16322) and (16323) are internal area records for the corresponding internal areas.

Figure 16C:
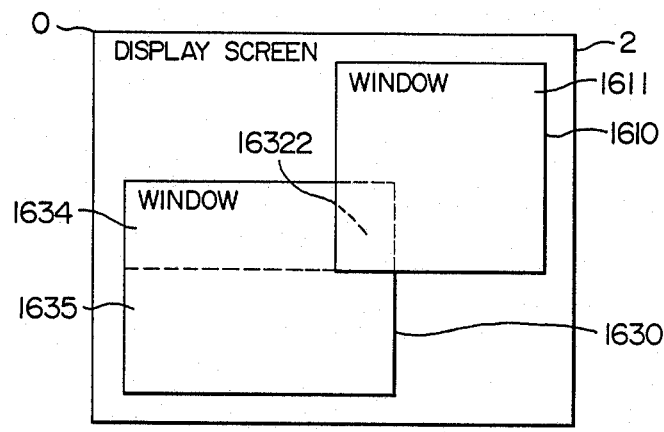

FIG. 16c shows a display after the internal area 1630 has been rearranged in the display of FIG. 16b. The internal areas (1631), (16321), (16323) and (1630) in FIG. 16b are assembled into (1634) and (1635).

According to the present invention for displaying overlapping windows variably in a multi-window display system, modification of display is made only for varied portions, whereby a natural and quick-response display can be achieved. Moreover, manipulation of windows such as parallel displacement, expansion and contraction can be performed using functions of making and deleting windows and modifying window overlap relations only for portions where changes are needed.

We claim:

1. A manipulative multi-window display method wherein display data rae selectively transferred from a plurality of segment memory means corresponding to windows to a bit map memory for a display screen in which a plurality of overlapping windows are displayed on the display screen so that only those portions of each of the windows which are not covered by any other window are displayed, the method comprising:

a first step, in response to a command to display a new window on said display screen, for making a first management record containing therein information as to the position to be assumed by said new window and as to a segment memory means corresponding to the new window and a second management record defining those internal areas in said new window which are to be displayed on said display screen and transferring to said bit map memory data read out from that segment memory which is specified by said first management record, said data being within that internal area which is defined by said second management record;

a second step, in response to a command to display said new window as a second window on said display screen in a display state in which a first window has already been displayed on said screen, for checking the positional relation between a display internal area defined by a second management record concerning said first window and said second window to determine whether or not there exist any overlapping partial areas therebetween; and upon determination that there does exist an overlapping partial area in said second step, a third step, after dividing the display internal area defined by a second management record concerning said first window into said overlapping partial area and the remaining partial area, for making a third management record including defining said overlapping partial area as a non-display internal area related to said second window and making a new second management record defining said remaining partial area as a display internal area;

a fourth step in response to a command to reverse the order of display priority between a first window being displayed on said display screen and a second window having higher display priority than said first window, for finding any of the third management records which is related to said second window; and upon finding of such a third management record as being related to said second window in said fourth step, a fifth step for transferring to said bit map memory data read out from that segment memory means which is specified by the first management record concerning said first window, said data to be transferred being within a display internal area which is newly defined, by a new second management record, in place of non display internal area defined by said third management record.

2. A method according to claim 1, in which said third step comprises dividing said remaining area into a plurality of rectangular areas so that said new second management record is made for each of said rectangular areas.

3. A method according to claim 2, in which said division is carried out by the use of an extension of one of the lateral and longitudinal sides of said second window as division lines.

4. A manipulative multi-window display method wherein display data are selectively transferred from a plurality of segment memory means corresponding to windows to a bit map memory for a display screen in which a plurality of overlapping windows are displayed on the display screen so that only those portions of each of the windows which are not covered by any other window are displayed, the method comprising:

a first step, in response to a command to display a new window on said display screen, for making a first management record containing therein information as to the position assumed by said new window and as to a segment memory means corresponding to the new window and a second management record defining those internal areas in said new window which are to be displayed on said display screen and transferring to said bit map memory data read out from that segment memory which is specified by said first management record, said data being within that internal area which is defined by said second management record;

a second step, in response to a command to display said new window as a second window on said display screen in a display state in which a first window has already been displayed on said screen, for checking the positional relation between a first display internal area defined by a second management record concerning said first window and said second window to determine whether or not there exist any overlapping partial areas therebetween; and upon determination that there exists an overlapping partial area in said second step, a third step, after dividing the display internal area defined by a second management record concerning said first window into said overlapping partial area and the remaining partial area, for making a third management record including defining said overlapping partial area as a non-display internal area related to said second window and making a new second management record defining said remaining partial area as a display internal area;

a fourth step, in response to a command to delete a second window in a display state wherein said second window having higher display priority than said first window existing on said display screen, for finding any of the third management records corresponding to said second window;

a fifth step, upon finding such a third management record pertaining to said second window in said fourth step, for transferring to said bit map memory data read out from that segment memory means which is specified by the first management record concerning said first window, said data to be transferred being within a display internal area which is newly defined, by a new second management record, in place of a non-display internal area defined by said third management record; and a sixth step for deleting data for said second window remaining on said bit map memory and invalidating the first and second management records corresponding to said second window.

5. A manipulative multi-window display method wherein display data are selectively transferred from a plurality of segment memory means corresponding to windows to a bit map memory for a display screen in which a plurality of overlapping window are displayed on the display screen so that only those portions of each of the windows which are not covered by any other window are displayed, the method comprising:

a first step, in response to a command to display a new window on said display screen, for making a first management record containing therein information as to the position assumed by said new window and as to a segment memory means corresponding to the new window and a second management record defining those internal areas n said new window which are to be displayed on said display screen and transferring to said bit map memory data read out from that segment memory which is specified by said first management record, said data being within that internal area which is defined by said second management record;

a second step, in response to a command to display said new window on said display screen in a display state wherein at least two existing windows have already been displayed on said screen, for selecting one by one an object window among said existing windows and for checking the positional relation between a display internal area defined by a second management record concerning said object window and said new window to determine whether or not there exist any overlapping partial areas therebetween; and upon determination that there exists an overlapping partial area in said second step, a third step, after dividing the display internal area defined by a second management record concerning said object window into said overlapping partial area and the remaining partial area, for making a third management record defining said overlapping partial area as a non-display internal are a related to said new window and making a new second management record defining said remaining partial area as a display internal area.

6. A method according to claim 5, further comprising:

upon issuance of a command to delete a second window in a display state having first, second and third windows displayed on said display screen, wherein said first window having a display priority lower than said second window and in which said second window being lower than said third window in the display priority, each of said first, second and third windows correspond to a different one of said existing and new windows, a fourth step for finding among the third management records concerning said first window any record which is related to said second window;

upon finding of a such a third management record concerning said first window and related to said second window in said fourth step, a fifth step of collating a first non-display internal area defined by said found third management record with a second non-display internal area defined by said third management record made corresponding to said second window to find an overlapping partial area therebetween;

upon finding of no overlapping partial area in said fifth step, a sixth step for transferring to said bit map memory data read out from that segment memory means which corresponds to said first window, said data to be transferred being within a display internal area which is newly defined, by a new second management record corresponding to said first window, for said first non-display area, with said third management record defining said first non-display area being invalidated;

upon finding of an overlapping partial area in said fifth step, a seventh step, after dividing said first non-display internal area into said found overlapping area and the remaining area, for making a third management record defining said overlapping partial area as a non-display internal area related to said third window, making a new second management record defining said remaining partial area as a display internal area, and transferring to said bit map memory data read out from that segment memory means which is corresponding to said first window, said data being within the display internal area defined by said new second management record, with the third management record defining said first non-display internal area being invalidated; and eighth step of deleting data remaining on said bit map memory and invalidating the first, second and third management records concerning said second window.

* * * * *